United States Patent
Josyula

(10) Patent No.: US 12,526,332 B2
(45) Date of Patent: Jan. 13, 2026

(54) NETWORK SERVICE INDICATOR ICONS

(71) Applicant: T-MOBILE INNOVATIONS LLC, Overland Park, KS (US)

(72) Inventor: Ramesh Venkata Josyula, Redmond, WA (US)

(73) Assignee: T-Mobile, Overland Park, KS (US)

( * ) Notice: Subject to any disclaimer, the term of this patent is extended or adjusted under 35 U.S.C. 154(b) by 126 days.

(21) Appl. No.: 18/308,469

(22) Filed: Apr. 27, 2023

(65) Prior Publication Data

US 2024/0364772 A1    Oct. 31, 2024

(51) Int. Cl.
*H04L 65/80*    (2022.01)
*H04L 41/06*    (2022.01)
*H04L 41/50*    (2022.01)
*H04L 41/5009*    (2022.01)

(52) U.S. Cl.
CPC .............. *H04L 65/80* (2013.01); *H04L 41/06* (2013.01); *H04L 41/5009* (2013.01); *H04L 41/5032* (2013.01)

(58) Field of Classification Search
CPC ..... H04L 65/80; H04L 41/06; H04L 41/5009; H04L 41/5032; H04L 41/5067
See application file for complete search history.

(56) References Cited

U.S. PATENT DOCUMENTS

| | | | |
|---|---|---|---|
| 8,024,438 B2 * | 9/2011 | Bedingfield, Sr. | .......................... H04L 41/0896 709/224 |
| 11,689,600 B1 * | 6/2023 | Halepovic | ............. H04L 43/091 709/224 |
| 2011/0055817 A1 * | 3/2011 | Noble | ...................... G06F 11/32 717/127 |
| 2012/0284763 A1 * | 11/2012 | Choi | ................... H04N 21/4622 725/110 |
| 2014/0087716 A1 * | 3/2014 | Vaderna | ................ H04W 24/08 455/422.1 |
| 2017/0126521 A1 * | 5/2017 | Lala | ....................... H04W 4/021 |

(Continued)

OTHER PUBLICATIONS

Anthony Spadafora, "Best speed test apps in 2023: Test your internet speed", Tom's Guide, https://www.tomsguide.com/news/best-speed-test-apps-test-your-wi-fi-and-internet-speed (accessed Sep. 13, 2023) (20 pages).

*Primary Examiner* — Jonathan A Bui
(74) *Attorney, Agent, or Firm* — Shook, Hardy, and Bacon L.L.P.

(57) ABSTRACT

The technology disclosed herein relates to methods, computer storage media, systems, etc., for generating a network service indicator icon for a communication service application. For example, the communication service application can provide one or more of a voice over internet protocol call, video call, three-dimensional video calling service, messaging communication service, another type of communication service, or one or more combinations thereof, to a user device. In embodiments, a first set of data performance information for the communication service application can be received from one or more servers providing the communication service application. A data performance metric can be determined for the communication service application based on receiving the first set of data performance information. A network service indicator icon for the communication service application can be generated based on the data performance metric determined.

20 Claims, 4 Drawing Sheets

(56) References Cited

U.S. PATENT DOCUMENTS

| | | | |
|---|---|---|---|
| 2018/0176095 A1* | 6/2018 | Diwakar | H04L 41/5009 |
| 2019/0149435 A1* | 5/2019 | Tapia | H04L 43/08 |
| | | | 709/224 |
| 2020/0366569 A1* | 11/2020 | White | H04L 41/0816 |
| 2021/0176142 A1* | 6/2021 | Clarke | H04L 41/5051 |
| 2022/0156338 A1* | 5/2022 | Jiang | H04L 67/1023 |
| 2023/0305944 A1* | 9/2023 | Biswas | G06F 11/3612 |

* cited by examiner

NETWORK SERVICE INDICATOR ICONS

SUMMARY

A high-level overview of various aspects of the invention is provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter. The present disclosure is directed, in part, to technology associated with a network service indicator icon, substantially as shown in and/or described in connection with at least one of the figures, and as set forth more completely in the claims.

In aspects set forth herein, and at a high level, the technology described herein relates to generating a network service indicator icon for a communication service application for display on a user interface of a user device. For example, the communication service application can be a three-dimensional video calling service application, an augmented reality service application, a virtual reality service application, a mixed reality application, a 360-degree video service application, an over-the-top messaging and voice application, a motion tracking service application, a projection mapping service application, another type of communication service application, or one or more combinations thereof. In embodiments, a first set of data performance information for the communication service application can be received from one or more servers providing the communication service application.

For example, the data performance information can include a latency measurement (e.g., a measurement between transmission of data from the communication service application and receipt by a server or user device, a measurement between transmission of data from the server or user device and receipt by the communication service application), a maximum bandwidth corresponding to the amount of data capable of being transmitted between the communication service application and the user device or the server, a minimum bandwidth, an actual bandwidth corresponding to a particular transmission or receipt of data, a packet loss corresponding to data packets that were lost from transmission of the data and receipt of the data, jitter corresponding to the variability in latency of data packets, an amount of data transmitted over the network within a particular amount of time, a mean opinion score measurement associated with the transmission of data, an availability measurement corresponding to the ability of the communication service application to maintain a connection between user devices, another type of data performance information, or one or more combinations thereof.

In some embodiments, a second set of data performance information for the plurality of communication service applications can be received from the user device. For example, the second set of data performance information can include a latency measurement associated with data transmission between the communication service application and the user device, one or more bandwidth measurements determined by the user device, a packet loss measurement determined by the user device, a mean opinion score measurement associated with the transmission or receipt of data, an availability measurement corresponding to the ability to maintain a connection with the communication service application, an availability measurement corresponding to the ability to maintain a connection with another user device that is also using the communication service application, another type of data performance information, or one or more combinations thereof.

In some embodiments, a first set of network performance information can be received, the first set of network performance information corresponding to at least one network component in communication with the one or more servers providing the first communication service application. For example, the network performance information can include network congestion data corresponding to the network of the at least one network component. In some embodiments, the network performance information corresponds to a radio access node configured as FD-MIMO, massive MIMO, MU-MIMO, cooperative MIMO, 3G, 4G, 5G, another generation communication system, or one or more combinations thereof. In some embodiments, the network performance information can correspond to a particular frequency band or a particular portion of a coverage area provided by a radio access node, a core network, etc. In some embodiments, the at least one network component is a load balancer of a core network or an edge network.

In embodiments, a data performance metric can be determined for the communication service application based on receiving the first set of data performance information. In some embodiments, the data performance metric can also be determined based on the second set of data performance information received from the user device. In some embodiments, the data performance metric can also be determined based on the first set of network performance information corresponding to the at least one network component. In some embodiments, the data performance metric is determined based on identifying a user device having a communication session with the first communication service application. In some embodiments, the data performance metric is determined based on identifying a location of the user device having the communication session with the first communication service application. In addition, one or more thresholds can be determined for each data performance metric.

In some embodiments, a data performance metric for each of a plurality of communication service applications is determined based on receiving one or more sets of data performance information. In some embodiments, a plurality of data performance metrics are determined for a first communication service application, wherein each data performance metric corresponds to a particular type of data performance information, and wherein each data performance metric is determined based on historical data performance information. Additionally, a network service indicator icon can be generated for the communication service application based on the data performance metric determined. In some embodiments, a plurality of network service indicator icons are generated for the first communication service application. In some embodiments, one or more network service indicator icons are generated for one or more communication service applications. The one or more network service indicator icons can be displayed via a user interface of the user device having the communication session with the one or more communication service applications.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
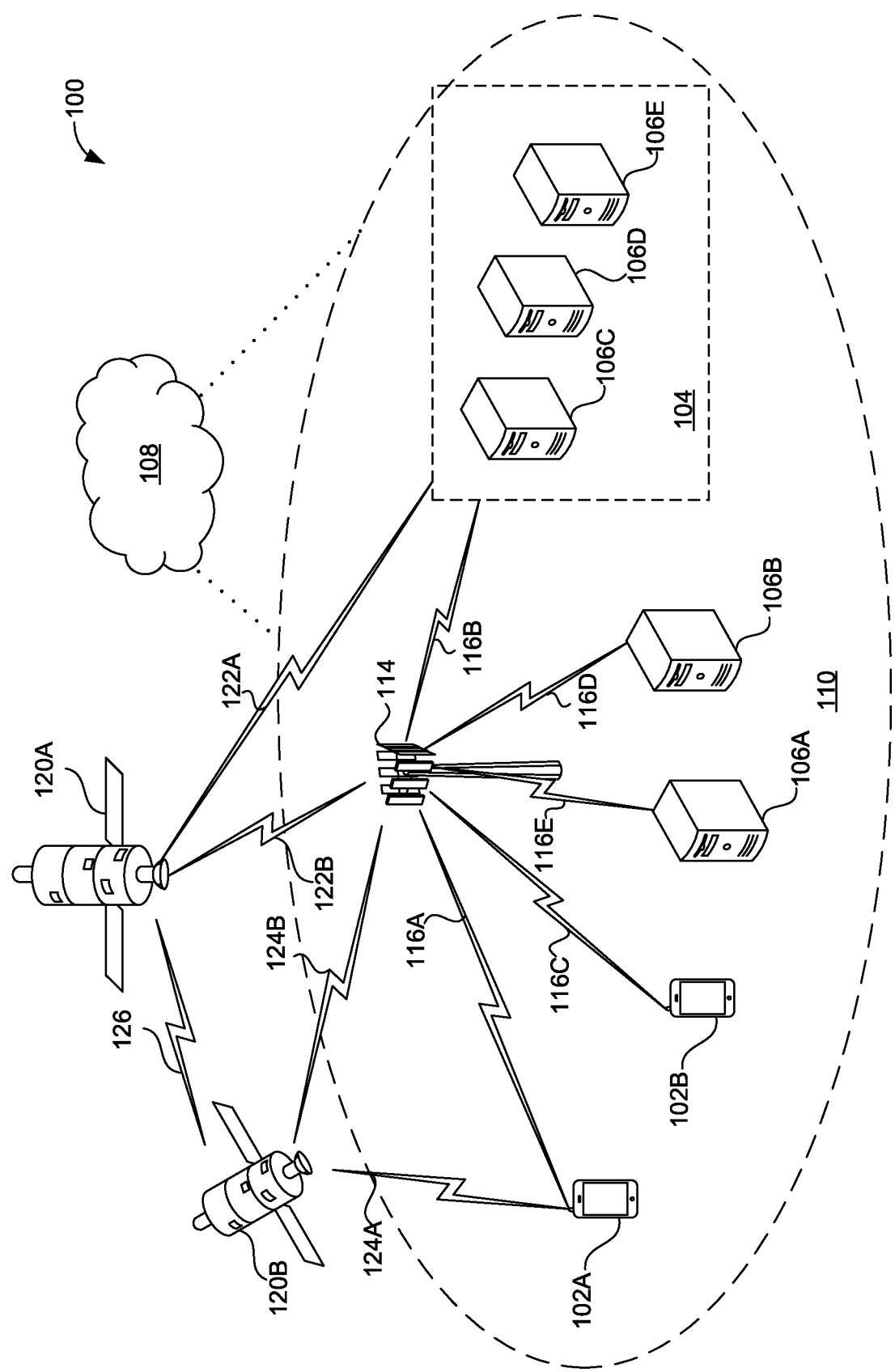
FIG. 1 depicts an example operating environment for generating the network service indicator icon, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Cellular Communication System
4G Fourth-Generation Cellular Communication System
5G Fifth-Generation Cellular Communication System
CD-ROM Compact Disk Read Only Memory
CDMA Code Division Multiple Access
CQI Channel Quality Information
CS Circuit Switch
CSF Channel State Feedback
CSI Channel State Information
D2D Device-to-Device
eNB Evolved Node B
gNB Next Generation Node B
GPRS General Packet Radio Service
GSM Global System for Mobile communications
DVD Digital Versatile Discs
EEPROM Electrically Erasable Programmable Read Only Memory
eMBB enhanced Mobile Broadband
EMS Enhanced Messaging Service
E-RAB E-UTRAN Radio Access Bearer
E-UTRAN Evolved Universal Terrestrial Radio Access Network
FD-MIMO Full-Dimension Multiple-Input Multiple-Output
GPS Global Positioning System
GSM Global Standards for Mobile communications
IoT Internet of Things
KPI Key Performance Indicator
LAN Local Area Network
LTE Long Term Evolution
MCS Modulation Coding Scheme
MIMO Multiple-Input Multiple-Output
mm wave Millimeter wave
MME Mobility Management Entity
MMS Multimedia Messaging Service
mMTC massive Machine Type Communications
MU-MIMO Multi-User Multiple-Input Multiple-Output
NR New Radio
P2P Peer-to-Peer
PC Personal Computer
PDA Personal Digital Assistant
PDP Packet Data Protocol
QoS Quality of Service
RAM Random Access Memory
RAN Radio Access Network
RAT Radio Access Technology
RBS Radio Base Station
RF Radio-Frequency
ROM Read Only Memory
RRC Radio Resource Control
RSRP Reference Signal Received Power
RSRQ Reference Transmission Receive Quality
RSSI Received Signal Strength Indicator
SDCCH Stand-alone Dedicated Control Channel
SINR Signal to Interference and Noise Ratio
SMS Short Message Service
SNR Signal-to-Noise Ratio
SRS Sound Reference Signal
TCH Traffic Channel
TDMA Time Division Multiple Access
UE User Equipment
UMTS Universal Mobile Telecommunications System
URLLC Ultra-Reliable Low Latency Communications
VLAN Virtual Local Area Network In addition, words such as "a" and "an," unless otherwise indicated to the contrary, may also include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Further, the term "some" may refer to "one or more." Additionally, an element in the singular may refer to "one or more."

The term "combination" (e.g., one or more combinations thereof) may refer to, for example, "at least one of A, B, or C"; "at least one of A, B, and C"; "at least two of A, B, or C" (e.g., AA, AB, AC, BB, BA, BC, CC, CA, CB); "each of A, B, and C"; and may include multiples of A, multiples of B, or multiples of C (e.g., CCABB, ACBB, ABB, etc.).

Other combinations may include more or less than three options associated with the A, B, and C examples.

As used herein, the phrase "based on" shall be construed as a reference to an open set of conditions. For example, an example step that is described as "based on X" may be based on both X and additional conditions, without departing from the scope of the present disclosure. In other words, as used herein, the phrase "based on" shall be construed in the same manner as the phrase "based at least in part on."

The term "mm wave," as used herein, may refer to the extremely high frequency band (e.g., from 30 GHz to 300 GHz). Additionally or alternatively, in some embodiments, a mm wave transmission includes one or more frequency ranges of 24 GHz, 26 GHZ, 28 GHZ, 39 GHz, and 52.6-71 GHz.

Additionally, a "user device," as used herein, is a device that has the capability of using a wireless communications network, and may also be referred to as a "computing device," "mobile device," "user equipment," "wireless communication device," or "UE." A user device, in some aspects, may take on a variety of forms, such as a PC, a laptop computer, a tablet, a mobile phone, a PDA, a server, or any other device that is capable of communicating with other devices (e.g., by transmitting or receiving a signal) using a wireless communication. A user device may be, in some embodiments, similar to user devices 102A-102B described herein with respect to FIG. 1 or similar to user device 400 described herein with respect to FIG. 4.

In embodiments, a user device may include internet-of-things devices, such as one or more of the following: a sensor, controller (e.g., a lighting controller, a thermostat), appliances (e.g., a smart refrigerator, a smart air conditioner, a smart alarm system), other internet-of-things devices, or one or more combinations thereof. Internet-of-things devices may be stationary, mobile, or both. In some aspects, the user device is associated with a vehicle (e.g., a video system in a car capable of receiving media content stored by a media device in a house when coupled to the media device via a local area network). In some aspects, the user device comprises a medical device, a location monitor, a clock, other wireless communication devices, or one or more combinations thereof. In some aspects, the user device is a wearable device having a camera, microphone, RFID, GPS, another sensor, or one or more combinations thereof, to capture data in real-time or near real-time (e.g., one or more strings of text, image data, video data, audio data, location data, other types of data, or one or more combinations thereof).

The wearable devices and other user devices, for example, can transmit the data obtained by their corresponding sensors to other user devices. For example, the sensor data obtained by a user device can be further transmitted for another user device to perform positional tracking (e.g., six degrees of freedom positional tracking) associated with the user device capturing the sensor data in real-time. In embodiments, a user device can access sensors, application data, tracking data, map data, other user device data, or one or more combinations thereof, for packet transmissions to a user device. In some embodiments, a wearable device can be a watch-type electronic device, a glasses-type wearable device, an upper-torso wearable device (e.g., a shirt having sensors affixed on or within the material of the shirt or a device that is attachable to the shirt), another type of wearable device, or one or more combinations thereof.

In aspects, a user device discussed herein may be configured to communicate using one or more of 4G (e.g., LTE), 5G, 6G, another generation communication system, or one or more combinations thereof. In some aspects, the user device has components to establish a 5G connection with a 5G gNB, and to be served according to 5G over that connection. In some aspects, the user device may be an E-UTRAN New Radio-Dual Connectivity (ENDC) device. ENDC allows a user device to connect to an LTE eNB that acts as a master node and a 5G gNB that acts as a secondary node. As such, in these aspects, the ENDC device may access both LTE and 5G simultaneously, and in some cases, on the same spectrum band.

A "communication service" refers to the transfer of information (e.g., without the use of an electrical conductor as the transferring medium). Communication services may be provided by one or more communication service applications. In embodiments, communication services provided by one or more communication service applications can correspond to the transfer of information via radio waves (e.g., Bluetooth®), satellite communication, infrared communication, microwave communication, Wi-Fi, mm wave communication, and mobile communication.

Embodiments of the present technology may be used with different telecommunication technologies or standards, including, but not limited to, CDMA 1× Advanced, GPRS, Ev-DO, TDMA, GSM, WiMAX technology, LTE, LTE Advanced, other technologies and standards, or one or more combinations thereof.

A "network" (e.g., network 108 of FIG. 1) facilitating the communication service applications may be one or more telecommunications networks, or a portion thereof. The network might include an array of network devices or components (e.g., one or more base stations, one or more antenna arrays of a radio access network node, one or more antenna elements of a radio access network node). The network can include multiple networks, and the network can be a network of networks. In embodiments, the network or a portion thereof is a core network, such as an evolved packet core, which may include evolved packet core network components, such as at least one MME, at least one serving gateway, and at least one Packet Data Network gateway. The MME may manage non-access stratum (e.g., control plane) functions such as mobility, authentication, and bearer management for other devices associated with the evolved packet core.

In some aspects, a network can facilitate connections between the communication service applications and one or more user devices. The network can also facilitate user device connections to a corresponding immediate service provider for services, such as 5G and LTE, for example. In some embodiments, a communication service application can provide communication services, such as a voice service, a message service (e.g., SMS messages, MMS messages, instant messaging messages, an EMS service messages), a three-dimensional video calling service, a multimedia communication service, an over-the-top messaging and voice service, a gaming service that provides gaming content including video content and audio content, an augmented reality service, a virtual reality service, a mixed reality service, a 360-degree video service, a motion tracking service, a projection mapping service, another type of data service, other types of communication services, or one or more combinations thereof. In embodiments, the communication service applications provide communication services to user devices or corresponding users that are registered or subscribed to utilize the one or more communication services.

Network components, such as terminals, links, and nodes (as well as other components), can provide connectivity in various implementations. For example, components of the network may include core network nodes, relay devices, integrated access and backhaul nodes, macro eNBs, small cell eNBs, gNBs, relay base stations, other network components, or one or more combinations thereof. The network may interface with one or more base stations through one or more wired or wireless backhauls. As such, the one or more base stations may communicate to devices via the network or directly. Furthermore, user devices can utilize the network to communicate with other devices (e.g., a user device(s), a server(s), etc.) through the one or more base stations.

As used herein, the term "base station" generally refers to one or more base stations, nodes, RRUs control components, and the like (configured to provide a wireless interface between a wired network and a wirelessly connected user device). A base station may comprise one or more radio access network nodes (e.g., eNB, gNB, and the like) that are configured to communicate with user devices. In some aspects, the base station may include one or more band pass filters, radios, antenna arrays, power amplifiers, transmitters/receivers, digital signal processors, control electronics, GPS equipment, and the like. In some embodiments, a radio access network node is a base station. A base station may be, in some embodiments, similar to base station 114 described herein with respect to FIG. 1.

In embodiments, the base station may refer to a base transceiver station, a radio base station, an access point, a radio transceiver, a NodeB, an eNB, a gNB, a Home NodeB, a Home eNodeB, another type base station, or one or more combinations thereof. A base station may comprise one or more of a macro base station, a small cell or femtocell base station, a relay base station, another type of base station, or one or more combinations thereof. In aspects, the base station may be configured as FD-MIMO, massive MIMO, MU-MIMO, cooperative MIMO, 3G, 4G, 5G, another generation communication system, or one or more combinations thereof. In addition, the base station may operate in an extremely high frequency region of the spectrum (e.g., from 30 GHz to 300 GHz), also known as the millimeter band.

Embodiments of the technology described herein may be embodied as, among other things, a method, system, or computer-program product. Accordingly, the embodiments may take the form of a hardware embodiment, or an embodiment combining software and hardware. An embodiment that takes the form of a computer-program product can include computer-useable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions-including data structures and program modules—in a modulated data signal (e.g., a modulated data signal referring to a propagated signal that has one or more of its characteristics set or changed to encode information in the signal). Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, prior relevant technologies have had drawbacks associated with identifying network indication factors. For example, the prior relevant technologies have not identified various network indication factors with respect to particular communication services, such as over-the-top messaging and voice applications (e.g., Facebook Messenger®, Line®, Skype®, Telegram®, Viber®, WhatsApp®, Zoom Video®, and other applications carrying voice calls, video calls, text messages, or multimedia messages). Rather, prior relevant technologies have provided telecommunication calling signal indicators that provide a depiction of the telecommunication call signal strength provided by a telecommunications operator. With over 126 million United States mobile phone users accessing just Facebook Messenger to communicate, the network details corresponding to this traffic are often obscure or unexplored. To maintain a high performance network for various types of electronic communication services, to comply with certain government regulations to intercept or block certain data, and to facilitate the efficiency and fast-pace emergency or business needs of the users of these applications, it is desirable to monitor, classify, and implement improvements to facilitate these highly utilized electronic services.

The technology provided herein provides various improvements to the electronic communication services discussed above. For example, the technology disclosed herein improves network resource utilization, enhances various electronic communication services, identifies various locations that user devices are experiencing electronic communication service deficiencies, and improves communications between or among user devices with each other or with particular servers by improving quality of service and user device experience corresponding to electronic communication services. Furthermore, the technology and corresponding techniques discussed herein can enhance the reliability and functionality of electronic communications.

One embodiment of the present technology includes a method for providing a network service indicator icon. The method comprises transmitting a request to receive a first set of data performance information for a first communication service application from one or more servers providing a first communication service via the first communication service application. The method also comprises receiving the first set of data performance information. The method also comprises receiving a first set of network performance information corresponding to at least one network component in communication with the one or more servers. The method also comprises determining a data performance metric for the first communication service application based on receiving the first set of data performance information and the first set of network performance information. The method also comprises generating a network service indicator icon for the first communication service application based on the data performance metric determined. The method also comprises causing to display, via an interface of a user device having a communication session with the first communication service application, the network service indicator icon.

Another of the present technology includes a method for receiving a network service indicator icon. The method comprises receiving, at a user device, a request for a first set of data performance information for a first communication service application downloaded onto the user device. In embodiments, the user device is at least camped on a portion of a coverage area and has at least established one communication session with the first communication service application. In some embodiments, the method also comprises receiving a second set of data performance information from one or more servers of the first communication service application. The method also comprises transmitting the data performance information. The method also comprises displaying, via an interface of the user device, a network service indicator icon generated for the first communication service application, wherein the network service indicator icon was generated based on at least one data performance metric determined based on transmitting the data performance information. In some embodiments, the network service indicator icon is also generated based on the user device transmitting location information.

In another embodiment, a system is provided for generating a network service indicator icon. The system comprises a user interface for displaying network service indicator icons. The system also comprises one or more processors and one or more computer storage memory having computer-executable instructions stored thereon that, when executed by the one or more processors, cause the one or more processors to perform operations. The operations include receiving a first set of data performance information for a plurality of communication service applications from one or more servers providing each of the plurality of communication service applications. The operations also include receiving a second set of data performance information for the plurality of communication service applications from a user device. The operations also include determining a data performance metric for each of the plurality of communication service applications based on receiving the first set of data performance information and the second set of data performance information. The operations also include generating a network service indicator icon for each of the plurality of communication service applications based on the data performance metric determined for each of the plurality of communication service applications. The operations also include displaying, via the user interface, the network service indicator icon for each of the plurality of communication service applications.

In yet another embodiment, computer storage media is provided for capacity management. For example, one or more non-transitory computer storage media having computer-executable instructions embodied thereon, that when executed by at least one processor, cause the at least one processor to perform a method. The method includes receiving a first set of data performance information for a first communication service application from a first server providing the first communication service application. In some embodiments, the method also includes identifying a user device having a communication session with the first communication service application. The method also includes determining a data performance metric for the first communication service application based on receiving the first set of data performance information and identifying the user device. The method also includes generating a network service indicator icon for the first communication service application based on the data performance metric determined for the first communication service application. The method also includes causing to display, via an interface of the user device, the network service indicator icon.

In some embodiments, the data performance metric determined for a first communication service application of the plurality of communication service applications is determined to be below a threshold. Continuing the example, in some embodiments, the data performance metric that is below the threshold can correspond to the data performance information received from a plurality of user devices. Location data can be generated or received for the plurality of user devices. In embodiments, it can be determined that each of the plurality of user devices are within a threshold distance from at least one other user device of the plurality of user devices, and cell sector information corresponding to the locations of the user devices can be identified. Based on the data performance metric being below the threshold, the network service indicator icon for the first communication service application can be updated for display on the plurality of user devices. Further, it can be determined that a portion of the cell sector and associated hardware components of the first communication service application are providing a first communications service below a threshold, and various notifications and alerts can be provided.

Those skilled in the art will appreciate that the computing devices described herein need not be limited to conventional personal computers, and can include other computing configurations, including servers, hand-held devices, multi-processor systems, a microprocessor based or programmable consumer electronics, network PCs, minicomputers, mainframe computers, other computing devices, or one or more combinations thereof. Similarly, the computing devices need not be limited to stand-alone computing devices, as the mechanisms may also be practiced in distributed computing environments where tasks are performed by remote processing devices that are linked through a wireless telecommunications network. In a distributed computing environment, program modules may be located in both local and remote memory storage devices.

Turning now to FIG. 1, example operating environment 100 supports the generation of network service indicator icons, in accordance with one or more embodiments disclosed herein. Example environment 100 is but one example of a suitable environment for the associated techniques disclosed herein, and is not intended to suggest any limitation as to the scope of use or functionality of the invention. Neither should the environment 100 be interpreted as having any dependency or requirement relating to any one or combination of components illustrated. For example, in some embodiments, the example operating environment 100 can include additional components not depicted.

Example operating environment 100 includes user devices 102A-102B, communication service application system 104, communication service application hardware components 106A-106E, network 108, coverage area 110, base station 114, communication links 116A-116E, satellites 120A and 120B, communication link 124B corresponding to satellite 120B and base station 114, communication link 122A corresponding to satellite 120A and communication service application system 104, communication link 122B corresponding to satellite 120A and base station 114, communication link 124A corresponding to satellite 120B and user device 102A, communication link 124B corresponding to satellite 120B and base station 114, and communication link 126 between satellites 120A and 120B. Example operational environment 100 is but one example environment for generating the network service indicator icon. For example, another embodiment may include additional base stations.

Example operating environment 100 having network 108 and coverage area 110 may be associated with one or more of a non-terrestrial network, an LTE network, an LTE-A network, an LTE-A Pro network, an NR network, a mm wave network, another type of network, or one or more combinations thereof. In some embodiments, the example operating environment 100 may support broadband communications, ultra-reliable (e.g., mission critical) communications, low latency communications, communications with low-cost and low-complexity devices, another type of communication, or one or more combinations thereof. In some embodiments, one or more communications between one or more devices in example operating environment 100 may correspond to the enhanced broadband communication, ultra-reliable communication, low latency communication, another type of communication, or one or more combinations thereof. For example, data performance information transmitted by a user device 102A-102B, communication service application system 104, communication service application hardware components 106A-106E, base station 114, communication links 116A-116E, satellites 120A and 120B, another device, or one or more combinations thereof, can be associated with the enhanced broadband communication, ultra-reliable communication, low latency communication, another type of communication, or one or more combinations thereof.

In embodiments, example environment 100 can utilize both licensed and unlicensed radio frequency bands. For example, the example environment 100 may employ License Assisted Access, LTE-Unlicensed radio access technology, or NR technology in an unlicensed band (e.g., 5 GHz industrial, scientific, and medical band). When operating in unlicensed radio frequency bands, base stations, satellites, or user devices may employ carrier sensing for collision avoidance and detection. In some examples, operations in unlicensed bands may be based on a carrier aggregation configuration and component carriers operating in a licensed band. Operations in unlicensed spectrum may include downlink transmissions, uplink transmissions, P2P transmissions, D2D transmissions, another type of unlicensed spectrum operation, or one or more combinations thereof. As such, data performance information transmitted by a user device 102A-102B, communication service application system 104, communication service application hardware components 106A-106E, base station 114, satellites 120A and 120B, another device, or one or more combinations thereof (e.g., via communications links 116A, 116C, 124A), can be transmitted (e.g., to the base station 114 or another device associated with example operating environment 100) via the licensed or unlicensed radio frequency band, 5 GHz industrial band, 5 GHz scientific band, 5 GHz medical band, a particular carrier aggregation configuration of a licensed band, P2P transmission, D2D transmission, another type of spectrum operation, or one or more combinations thereof. In some embodiments, the data performance information can correspond to both the communication service application and the unlicensed radio frequency band, for example.

In embodiments, user devices 102A-102B may wirelessly communicate via one or more wireless telecommunication services provided by one or more base stations (e.g., user device 102B may wireless communicate via a wireless telecommunication service provided by base station 114), one or more satellites (e.g., user device 102A may wireless communicate via a wireless telecommunication service provided by satellite 120A, 120B, another satellite, or one or more combinations thereof), other types of wireless telecommunication devices, or one or more combinations thereof. As such, user device 102A-102B can transmit data performance information (e.g., a three-dimensional video calling service application data performance information, an augmented reality service application data performance information, a virtual reality service application data performance information, a mixed reality application data performance information, a 360-degree video service application data performance information, an over-the-top messaging and voice application data performance information, a motion tracking service application data performance information, a projection mapping service application data performance information, another type of communication service application data performance information, or one or more combinations thereof) between each other, to the base station 114, to one or more of the satellites 120A-120B, to one or more of the communication service application hardware components 106A-106E, to another device, or one or more combinations thereof.

In example environment 100, network 108, base station 114, and satellites 120A-120B can provide coverage area 110 for supporting communication signals according to one or more radio access technologies. Supported communication signals within coverage area 110 can include MU-MIMO and SU-MIMO transmissions, for example. In some embodiments, the data performance information transmitted by user devices 102A-102B, communication service application system 104, communication service application hardware components 106A-106E, base station 114, satellites 120A and 120B, another device, or one or more combinations thereof, can correspond to both the communication service application and the MU-MIMO and SU-MIMO transmissions, for example.

In embodiments, the user devices 102A-102B can be stationary, mobile, or one or more combinations thereof at different times. For example, in some embodiments, user device 102A transmits a first set of data performance information at a first location and a second set of data performance information at a second location, wherein the first and second location can be identified by the base station 114. Additionally, the user devices 102A-102B may be able to communicate with various types of devices, such as other UEs, various types of base stations (e.g., one or more antennas or antenna arrays, a relay device, integrated access and backhaul nodes, other types of base station components, or one or more combinations thereof), or various types of communication service application hardware components 106A-106E, other devices, or one or more combinations thereof. In embodiments, one or more of the user devices 102A-102D may have different capabilities. For instance, a user device can be wearable devices having a camera, microphone, RFID, GPS, another sensor, or one or more combinations thereof. In some embodiments, a user device is a wearable device can be a watch-type electronic wearable device, a glasses-type wearable device, an upper-torso wearable device (e.g., a shirt having sensors affixed on or within the material of the shirt or a device that is attachable to the shirt), another type of wearable device, or one or more combinations thereof.

In embodiments, one or more of the user devices 102A-102B may include one or more of a unit, a station, a terminal, or a client, for example. The user devices 102A-102B may also include a wireless local loop station, an IoT device, an Internet of Everything device, a machine type communication device, an evolved or enhanced machine type communication device, another type of user device, or one or more combinations thereof. The machine type communication device or the evolved or enhanced machine type communication device may include, for example, one or more robots, drones, remote devices, sensors, meters, monitors, location tags, etc., that may communicate with a base station, another device (e.g., remote device), or some other entity. In some embodiments, a user device may be implemented in various objects such as appliances, vehicles, meters, or other objects. In some embodiments, one or more of the user devices 102A-102B may, at one time or another, act as a relay, base station, (e.g., a UAV acting as an aerial base station), or the network equipment (e.g., macro eNBs or gNBs, small cell eNBs or gNBs, or relay base stations). As such, in some embodiments, the user devices 102A-102B can transmit data performance information corresponding to both the communication service application and the type of user device that is the unit, station, terminal, client, wireless local loop station, IoT device, Internet of Everything device, machine type communication device, evolved or enhanced machine type communication device, user device implemented in an object, another type of user device, or one or more combinations thereof.

Coverage area 110 can provide services from network 108, such as network provider services including the Internet, Intranet, Internet Protocol Multimedia Subsystem, Packet-Switched Streaming Service, another type of network provider service, or one or more combinations thereof. In some embodiments, the data performance information may correspond to both the communication service application and the operating configurations of a network provider service (e.g., Internet, Intranet, Internet Protocol Multimedia Subsystem, Packet-Switched Streaming Service). In addition, in some embodiments, one or more of the user devices 102A-102B, communication service application hardware components 106A-106E, base station 114, satellites 120A-120B, or one or more combinations thereof, can communicate with the network 108 via a core network, one or more network components (e.g., a core network node, a relay device, an MME, an integrated access and backhaul node, a macro eNB, a small cell eNB, a gNB, a relay base station), or one or more combinations thereof. In some embodiments, one or more of the user devices 102A-102B, communication service application hardware components 106A-106E, base station 114, satellites 120A-120B, or one or more combinations thereof, communicate with the network 108 over one or more backhaul links (e.g., via an X2, Xn, or other interface) either directly (e.g., directly between base stations), or indirectly (e.g., via core network), or one or more combinations thereof. The backhaul links may be or include one or more wireless links, for example.

In embodiments, the base station 114 may operate using MIMO transmissions. For example, the base station 114 can be configured as FD-MIMO, massive MIMO, MU-MIMO, cooperative MIMO, 4G, 5G, another generation communication system, or one or more combinations thereof, for providing telecommunication services to one or more of user devices 102A-102B. In embodiments, the base station 114 can perform one or more of the following functions: transfer user data, radio channel ciphering and deciphering, integrity protection, header compression, mobility control functions (e.g., handover, dual connectivity), inter-cell interference coordination, connection setup and release, load balancing, distribution for a non-access stratum message or node selection, a synchronization, radio access network sharing, multimedia broadcast multicast service, subscriber and equipment trace, radio access network information management, paging, positioning, delivery of warning messages, other functions, or one or more combinations thereof. In embodiments, the data performance information may correspond to both the communication service application and one or more of these functions.

In some embodiments, base station 114 antennas (or antenna arrays) having antenna elements may be co-located at an antenna assembly, such as an antenna tower. In some examples, antennas or antenna arrays associated with the base station 114 can be located in diverse geographic locations. As such, in some embodiments, the data performance information may be received at one or more of these diverse geographic locations. In some aspects, one or more nodes corresponding to base station 114 may comprise one or more macro cells, one or more small cells, one or more relay base stations, one or more repeaters, one or more femtocells, other types of cells, or one or more combinations thereof. In other embodiments, the base station 114 can be movable, thereby providing communication coverage for a moving geographic coverage area (e.g., wherein coverage area 110 is a moving coverage area). In some embodiments, one or more antennas of base station 114 can use MIMO antenna technology, including spatial multiplexing, beamforming, transmit diversity, other MIMO functions, or one or more combinations thereof. In some embodiments, the data performance information may correspond to both the communication service application and the spatial multiplexing, beamforming, transmit diversity, other MIMO functions, or one or more combinations thereof.

In embodiments, the satellites 120A-120B may communicate with other types of network components (e.g., the base station 114, user devices 102A-102D, or other high altitude or terrestrial nodes) within coverage area 110. A "satellite" may be referred to as a space vehicle or communication satellite. Satellites 120A-120B may be any suitable type of communication satellite configured to relay communications between different radio access network nodes or end nodes in a wireless communication system. Satellites 120A-120B may be or include a space satellite, a balloon, a dirigible, an airplane, a drone, an unmanned aerial vehicle, another type of satellite, or one or more combinations thereof. In some examples, the satellites 120A-120B may be in a geosynchronous or geostationary earth orbit, a low earth orbit, a medium earth orbit, another type of orbit, or one or more combinations thereof. In some embodiments, satellites 120A-120B may be a multi-beam satellite configured to provide service for multiple service beam coverage areas in a predefined geographical service area (e.g., coverage area 110). The satellites 120A-120B may be any distance away from the surface of the earth.

In some embodiments, satellites 120A-120B may be deployed at an altitude of 18 km to 25 km (e.g., a geostationary balloon satellite), wherein the stratosphere has low wind speeds (e.g., 5 m/s to 40 m/s) and low turbulence. In embodiments, satellites 120A and 120B may be configured to communicate with each other (e.g., via communication link 126). As such, the communication link 126 may include a free space optical link, a microwave link, electromagnetic wave signals via mm wave signals, optical signals via a laser, another type of communication link, or one or more combinations thereof. In some embodiments, the data performance information may correspond to both the communication service application and the free space optical link, microwave link, electromagnetic wave signals via mm wave signals, optical signals via a laser, another type of communication link, or one or more combinations thereof.

In embodiments, satellites 120A-120B may be configured to communicate via a wireless common public radio interface protocol, a dedicated wireless front haul protocol developed for high-altitude-to-high-altitude, another protocol, or one or more combinations thereof. As such, in some embodiments, the data performance information may correspond to both the communication service application and the measurement of the wireless common public radio interface protocol, dedicated wireless front haul protocol developed for high-altitude-to-high-altitude, the other type of communication link, or one or more combinations thereof.

In some embodiments, one or more portions of coverage area 110 may be provided or established by satellites 120A-120B as part of a non-terrestrial network. Satellites 120A-120B may, in some cases, perform the functions of a base station or may act as a bent-pipe satellite, act as a regenerative satellite, act as another type of satellite, or one or more combinations thereof. In other cases, satellites 120A-120B may be a smart satellite, or a satellite with intelligence. For example, a smart satellite may be configured to perform more functions than a regenerative satellite (e.g., may be configured to perform particular algorithms beyond those used in regenerative satellites or to be reprogrammed, for example). A bent-pipe transponder or satellite may be configured to receive signals from ground base stations (e.g., base station 114) and transmit those signals to different ground base stations. In some embodiments, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, another type of satellite or regenerative transponder function, or one or more combinations thereof. For example, a bent-pipe satellite may receive a signal from a base station and may relay the signal to a user device or base station, or vice-versa. As such, in some embodiments, the data performance information may correspond to both the communication service application and the type of satellite (e.g., bent-pipe satellite, regenerative satellite, smart satellite, other type of satellite, or one or more combinations thereof). In some embodiments, the data performance information may correspond to both the communication service application and the demodulated signal, decoded signal, re-encoded signal, modulated signal, another type of satellite or regenerative transponder function, or one or more combinations thereof.

In embodiments, one or more of the user devices 102A-102B, the base station 114, satellites 120A-120B, communication service application hardware components 106A-106E, another network component (e.g., an MME), or one or more combinations thereof, may have one or processors capable of processing the data performance information, user device location data, weather data (e.g., humidity data, ultraviolet data, temperature data), data performance information for ultra-reliable data, data performance information for low-latency data, data performance information for critical data, other types of data, or one or more combinations thereof. In some embodiments, the one or more processors may include one or more of a system-on-a-chip, a processor core, a graphics processor unit, a central processing unit, an accelerator (e.g., a digital signal processor, a graphics accelerator, a compression accelerator, an artificial intelligence accelerator), a chipset processor, a general-purpose processor, a general-purpose graphics processor unit, an accelerated processing unit, a field-programmable gate array, a neural network processing unit, a data processor unit, a controller, another type of processor or processor unit, or one or more combinations thereof. In some embodiments, the processor unit may be located in a single integrated circuit component (e.g., multi-chip module) or in separate integrated circuit components.

In embodiments, the one or more processors can determine a data performance metric for one or more communication service applications based on receiving the data performance information. For example, in an embodiment, communication service application hardware component 106A provides one or more communication services via a first communication service application, communication service application hardware component 106B provides one or more communication services via a second communication service application, and communication service application system 104 including communication service application hardware component 106C-106E provides one or more communication services via a third communication service application. The communication service application hardware components 106A-106E may be an application server or application server platform providing data transfers between a communication service application and networked devices (e.g., user device 102A). In one embodiment, a communication service application hardware component is the same as a user device (e.g., user devices 102A-102B or user device 400 described herein with respect to FIG. 4). In an embodiment, an application server platform can provide access to the network 108, such as a LAN, a wide area network, a metropolitan area network, a personal area network, Bluetooth, a cloud network, a mobile network (e.g., 3G, 4G, 5G, 6G, etc.), an intranet, the Internet, etc. A network interface may include, for example, a wireless network interface having antenna, which may represent one or more antennas. A network interface may also include, for example, a wired network interface to communicate with remote devices via network cable, which may be, for example, an Ethernet cable, a coaxial cable, a fiber optic cable, a serial cable, or a parallel cable.

A communication service application, in some implementations, may be embodied as one or more communication service application hardware components, firmware, software, or a combination thereof. As such, in some embodiments, one or more of the communication service application hardware components 106A-106E may be embodied as circuitry or collection of electrical devices. Additionally, in some embodiments, one or more of the communication service application hardware components 106A-106E may form a portion of another communication service application hardware component. In some embodiments, one or more of communication service application hardware components 106A-106E may communicate with various trusted or untrusted versions of network interface controllers. In an example embodiment, communication service application hardware component 106A provides one or more communication services via an augmented reality service application, communication service application hardware component 106B provides one or more communication services via an over-the-top messaging and voice application, and communication service application system 104 including communication service application hardware component 106C-106E provides one or more communication services via a gaming service application that provides gaming content including video content and audio content.

In embodiments, one or more of the user devices 102A-102B, the base station 114, satellites 120A-120B, communication service application hardware components 106A-106E, another network component (e.g., an MME), or one or more combinations thereof, can determine (e.g., via the one or more processors discussed above) a data performance metric for each of the first communication service application (e.g., the augmented reality service application), the second communication service application (e.g., the over-the-top messaging and voice application), and the third communication service application (e.g., the gaming service application), based on receiving the data performance information. For example, the data performance metric for the first communication service application represents a signal or service strength corresponding to a communication session between a user device and the first communication service application. In some embodiments, the data performance metric for the third communication service application is determined based on communications between the communication service application hardware components 106C-106E. In another embodiment, the data performance metric for the third communication service application may be determined based on communications between the communication service application hardware components 106C-106E and communication service application hardware component 106B. In yet another embodiment, the data performance metric for the third communication service application may be determined based on communications between the communication service application hardware components 106C-106E and base station 114. In yet another embodiment, the data performance metric for the third communication service application may be determined based on communications between the communication service application hardware components 106C-106E and one or more of satellites 120A-120B.

In some embodiments, the data performance metric for the third communication service application may be determined based on communications between the communication service application hardware components 106C-106E and one or more of user devices 102A-102B. In some embodiments, the data performance metric for the third communication service application may be determined based on communications between the user devices 102A-102B, wherein the user devices 102A and 102B are each communicating or attempting to communication via the third communication service application. In some embodiments, the data performance metric for the third communication service application may be determined based on communications between one or more of communication service application hardware components 106C-106E and one or more trusted or untrusted network interface controllers. In some embodiments, the data performance metric for one of the communication service applications may be below a threshold.

Based on the data performance metric determined for each of the communication service applications, a network service indicator icon is generated for each of the communication service applications. The generated network service indicator icon is displayed, via the user interface of one or more user devices 102A-102B, for each of the communication service applications. Each of the network service indicator icons can be updated upon receipt of additional data performance information, and the updated network service indicator icons can be displayed via the user interface.

Figure 2:
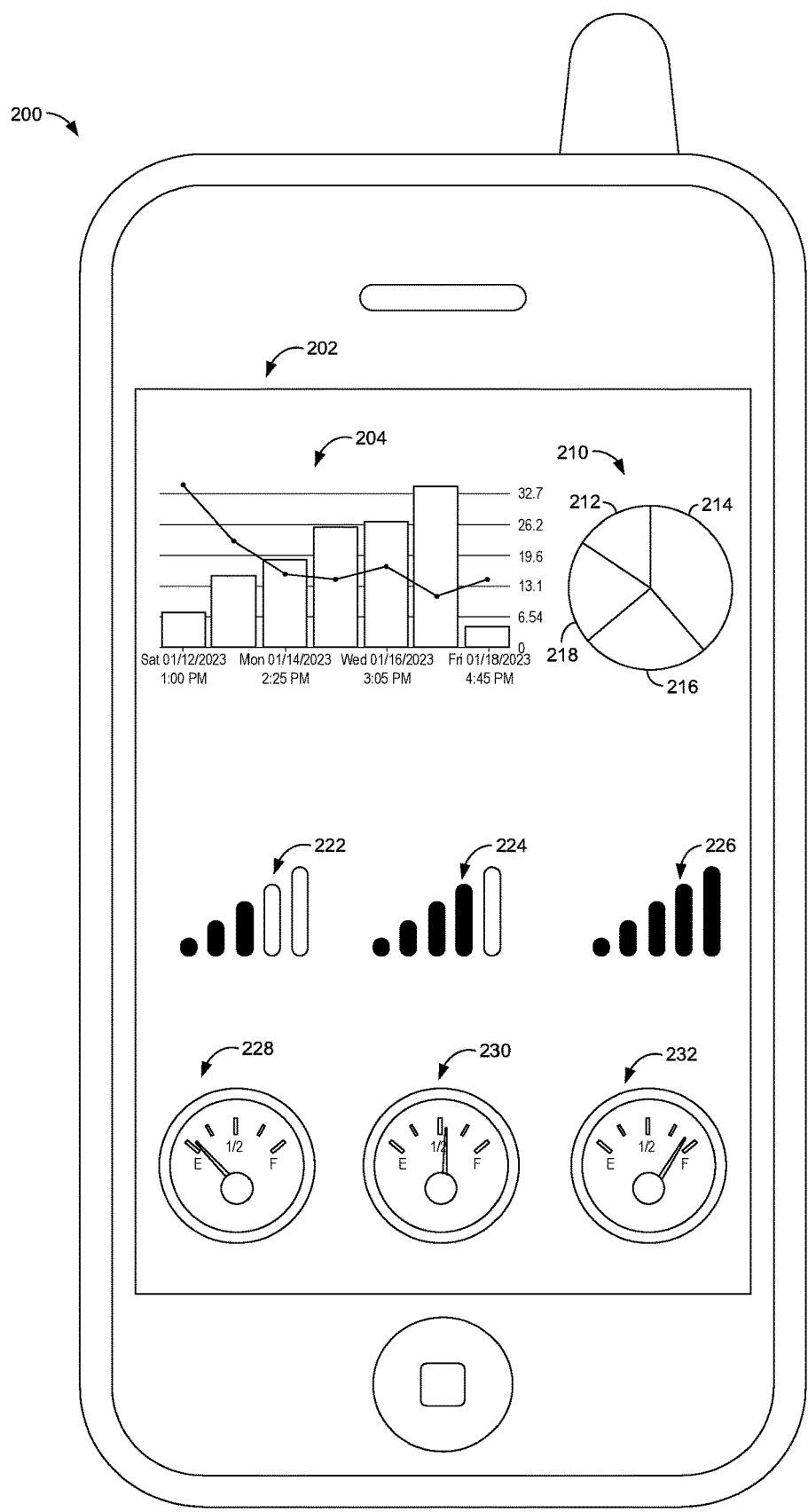
FIG. 2 depicts an example embodiment of the network service indicator icon, in accordance with aspects herein.

FIG. 2 provides example network service indicator icon environment 200, in accordance with one or more embodiments disclosed herein. Example network service indicator icon environment 200 is but one example of a network service indicator icon environment and is not intended to suggest a particular limitation as to the scope of use or functionality of the invention. Neither should the network service indicator icon environment 200 be interpreted as having any particular dependency or requirement relating to any one or combination of components illustrated. For example, in some embodiments, the example network service indicator icon environment 200 can include network service indicator icons not depicted or other variations of network service indicator icons.

Example network service indicator icon environment 200 includes a user interface 202 of a user device, network service indicator icon 204, network service indicator icon 210, and network service indicator icons 222, 224, 226, 228, 230, 232. In embodiments, the network service indicator icon 204 can illustrate data performance metrics for a communication service application based on receiving data performance information for particular times during a particular time range of a particular day. For example, the bar graphs illustrate data performance metrics during various times at various dates. As another example, the line graph illustrates historical data performance metrics for the communication service application. For example, the data performance metric for Saturday at 1:00 PM may be outside of a particular standard deviation based on the historical data performance metrics for the communication service application. In embodiments, alerts may be provided via the user interface 202 when a data performance metric is not within a particular range based on historical data performance metrics.

In embodiments, the network service indicator icon 210 can illustrate data performance metrics for multiple communication service applications based on associated data performance information. For example, the network service indicator icon 210 can illustrate a first data performance metric 212 for a first communication service application, a second data performance metric 214 for a second communication service application, a third data performance metric 216 for a third communication service application, and a fourth data performance metric 218 for a fourth communication service application. Additionally or alternatively, network service indicator icons 222, 224, 226, 228, 230, 232 can illustrate various way to indicate speed or reliability of one or more communication services provided by a particular communication service application.

Example Flowchart

Figure 3:
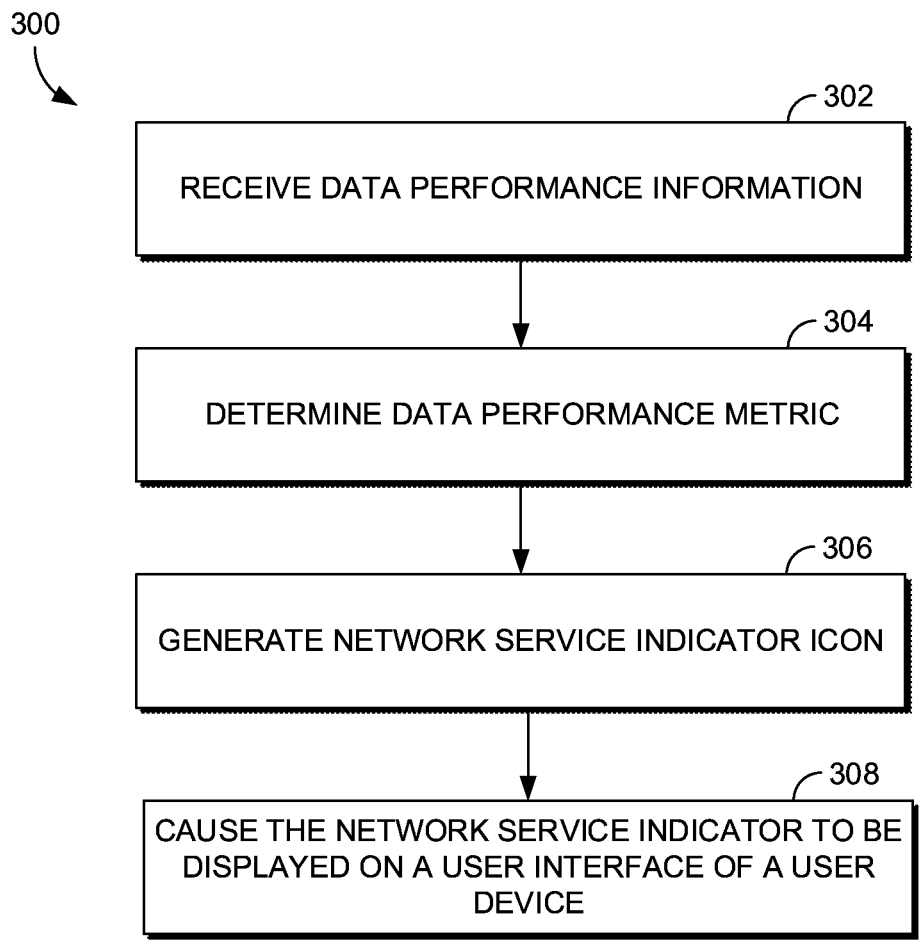
FIG. 3 illustrates an example flowchart for providing the capacity dashboard, in accordance with aspects herein.

Having described the example embodiments discussed above, an example flowchart is described below with respect to FIG. 3. Example flowchart 300 begins at Step 302 with receiving data performance information. For example, a first set of data performance information can be received for a plurality of communication service applications from one or more servers providing each of the plurality of communication service applications. In some embodiments, a plurality of servers provide a first communication service application of the plurality of communication service applications and a first server provides a second communication service application of the plurality of communication service applications, and the first set of data performance information is received from the first server and the plurality of servers. In an embodiment, the first communication service application of the plurality of communication service applications is a three-dimensional video calling service application. In an embodiment, a first communication service application of the plurality of communication service applications provides voice calling communication services, and wherein a second communication service application of the plurality of communication service applications provides multimedia communication services. In an embodiment, at least two of the plurality of communication service applications are an over-the-top messaging and voice applications. Continuing this example, the first set of data performance information may correspond to an over-the-top communication session for each of the at least two of the plurality of communication service applications that are the over-the-top messaging and voice applications, and a first server of the one or more servers may be a mediator server.

For example, a mediator server is a server that acts as a mediator or intermediary between two or more devices or systems communicating or attempting to communicate with each other. A mediator server can facilitate communication and ensure that the devices or systems can communicate effectively, even if those devices or systems are using different protocols or data formats. A mediator server can distribute traffic across multiple servers or systems to ensure that a load is evenly balanced and that a single system does not become overloaded. In embodiments, the mediator server corresponds to an IoT system, an enterprise network, a cloud computing platform, another type of system, or one or more combinations thereof. The mediator server can also translate data from one protocol to another or transform various formats of data for communications between the devices or systems.

In some embodiments, the first set of data performance information is received based on the transmission of a request for the first set of data performance information from a first communication service application via one or more servers providing a first communication service via the first communication service application. In some embodiments, the first communication service application is a gaming service application that provides gaming content including video content and audio content, and wherein the one or more servers is a cloud gaming server. In some embodiments, the first communication service application has a plurality of microservices (e.g., implemented via a data center architecture including the one or more servers). For example, the microservices may be implemented across a cloud, enterprise, IoT, implemented with an edge computing architecture, another type of implementation, or one or more combinations thereof. A microservice can include a decomposition of a monolithic application into small manageable defined services. A microservice can be characterized by one or more of use of fine-grained interfaces (to independently deployable services), polyglot programming (e.g., code written in multiple languages to capture additional functionality and efficiency not available in a single language), lightweight container or virtual machine deployment, decentralized continuous microservice delivery, another type of microservice, or one or more combinations thereof. In some embodiments, each microservice runs in its own process and communicates using protocols (e.g., an HTTP resource API, message service, remote procedure calls (RPC), JavaScript Object Notation (JSON), Thrift, etc.). In some embodiments, the microservices can be independently deployed using centralized management (e.g., written in different programming languages and use different data storage technologies) of these services.

In some embodiments, the first communication service application provides voice over internet protocol calls, video calls, messaging communication services, another type of communication service, or one or more combinations thereof, to the user device. In some embodiments, the a first set of data performance information is received for the first communication service application from a first server, and a second set of data performance information for the first communication service application is received from a second server providing communication services via the first communication service application. In some embodiments, a second set of data performance information for a second communication service application is received from a second server providing the second communication service application, wherein the user device has a communication session with the second communication service application. In some embodiments, a third set of data performance information for a third communication service application is received from a third server providing the third communication service application, wherein the user device has a communication session with the third communication service application.

In some embodiments, a second set of data performance information can be received for the plurality of communication service applications from a user device. For example, the second set of data performance information can include a latency measurement associated with data transmission between the communication service application and the user device, one or more bandwidth measurements determined by the user device and corresponding to the data transmission between the user device and communication service application, a packet loss measurement determined by the user device and corresponding to the data transmission between the user device and communication service application, a mean opinion score measurement associated with the data transmission between the user device and communication service application, an availability measurement corresponding to the ability to maintain a connection with the communication service application, an availability measurement corresponding to the ability to maintain a connection with another user device that is also using the communication service application, another type of data performance information, or one or more combinations thereof. In some embodiments, a second set of data performance information for the first communication service application is received from a plurality of user devices using the first communication service application. In some embodiments, at least two of the plurality of user devices have different capabilities or are different types of user devices.

In some embodiments, a first set of network performance information is also received, the first set of network performance information corresponding to at least one network component in communication with the one or more servers. For example, the network performance information can include network congestion data corresponding to the network of the at least one network component. In some embodiments, the network performance information corresponds to a radio access node configured as FD-MIMO, massive MIMO, MU-MIMO, cooperative MIMO, 3G, 4G, 5G, another generation communication system, or one or more combinations thereof. In some embodiments, the network performance information can correspond to a particular frequency band or a particular portion of a coverage area provided by a radio access node, a core network, etc. In some embodiments, the at least one network component is a load balancer or gateway of a core network or an edge network. In some embodiments, the network component is a radio, antenna array, power amplifier, transmitters/receiver, digital signal processor, control electronic, another type of network component, or one or more combinations thereof, of a base station, satellite, or another type of radio access network node.

Step 304 includes determining a data performance metric for one or more communication service applications based on receiving the data performance information. In some embodiments, the data performance metric is determined one or more sets of the data performance information. In some embodiments, the data performance metric is determined using historical data performance information. In some embodiments, the data performance metric is determined for an over-the-top messaging and voice application. In some embodiments, the data performance metric is determined from data performance information received from one or more mediator servers facilitating communications between user devices and the one or more communication service applications. In some embodiments, the data performance metric is determined using protocols or data formats associated with the data performance information. In some embodiments, the data performance metric is determined using data performance information corresponding to traffic across multiple servers or systems via the mediator server. In some embodiments, the data performance metric is determined using load balancing data from the mediator server. In embodiments, the data performance metric corresponds to an IoT system, an enterprise network, a cloud computing platform, another type of system, or one or more combinations thereof.

In some embodiments, the data performance metric is determined for a gaming service application that provides gaming content including video content and audio content provided via a cloud gaming server. In some embodiments, the data performance metric is determined for a first communication service application having a plurality of microservices (e.g., implemented via a data center architecture including the one or more servers, across a cloud, enterprise, IoT, implemented with an edge computing architecture, another type of implementation, or one or more combinations thereof). In some embodiments, the data performance metric corresponds to one or more protocols (e.g., an HTTP resource API, message service, remote procedure calls (RPC), JavaScript Object Notation (JSON), Thrift, etc.) of the first communication service application.

In some embodiments, the data performance metric is determined using the second set of data performance information for the second communication service application received from a second server providing the second communication service application, wherein the user device has a communication session with the second communication service application. In some embodiments, the data performance metric is determined using the third set of data performance information for the third communication service application received from the third server providing the third communication service application, wherein the user device has a communication session with the third communication service application. In some embodiments, the data performance metric is determined using the second set of data performance information received for one or more communication service applications from one or more user devices. In some embodiments, the data performance metric is determined using data performance information received for particular times during a particular time range of a particular day. In some embodiments, the data performance metric is determined based on identifying a user device having a communication session with the first communication service application. In some embodiments, the data performance metric is determined based on identifying a location of the user device.

In some embodiments, a second data performance metric can be determined for the second communication service application based on receiving the second set of data performance information from the server corresponding to the second communication service application and identifying the location of the user device. In some embodiments, a third data performance metric for the third communication service application can be determined based on receiving the third set of data performance information from the server corresponding to the third communication service application and identifying the location of the user device. In some embodiments, the data performance metric is determined based on identifying a portion of a coverage area in which the user device is located. In some embodiments, the data performance metric determined for a first communication service application of the plurality of communication service applications can be determined to be below a threshold.

At Step 306, the network service indicator icon is generated and at Step 308, the network service indicator icon is displayed on a user interface of a user device in communication with a corresponding communication service application. In embodiments, a network service indicator icon is generated for each of a plurality of communication service applications based on the data performance metric determined for each of the plurality of communication service applications, and each of the network service indicator icons can be displayed on the user interface. In some embodiments, the network service indicator icon is updated for the first communication service application based on the data performance metric for the first communication service application being below the threshold, and the updated network service indicator icon can be displayed on the user interface. In some embodiments, a plurality of network service indicator icons are generated for the first communication service application using one or more data performance metrics determined for the first communication service application. In an embodiment, a second network service indicator icon is generated for the second communication service application based on the data performance metric determined for the second communication service application and a third network service indicator icon is generated for the third communication service application based on the third data performance metric determined for the third communication service application.

Example User Device

Having described the example embodiments discussed above of the presently disclosed technology, an example operating environment of an example user device (e.g., user device 102A of FIG. 1) is described below with respect to FIG. 4. User device 400 is but one example of a suitable computing environment, and is not intended to suggest any particular limitation as to the scope of use or functionality of the technology disclosed. Neither should user device 400 be interpreted as having any dependency or requirement relating to any particular component illustrated, or a particular combination of the components illustrated in FIG. 4.

Figure 4:
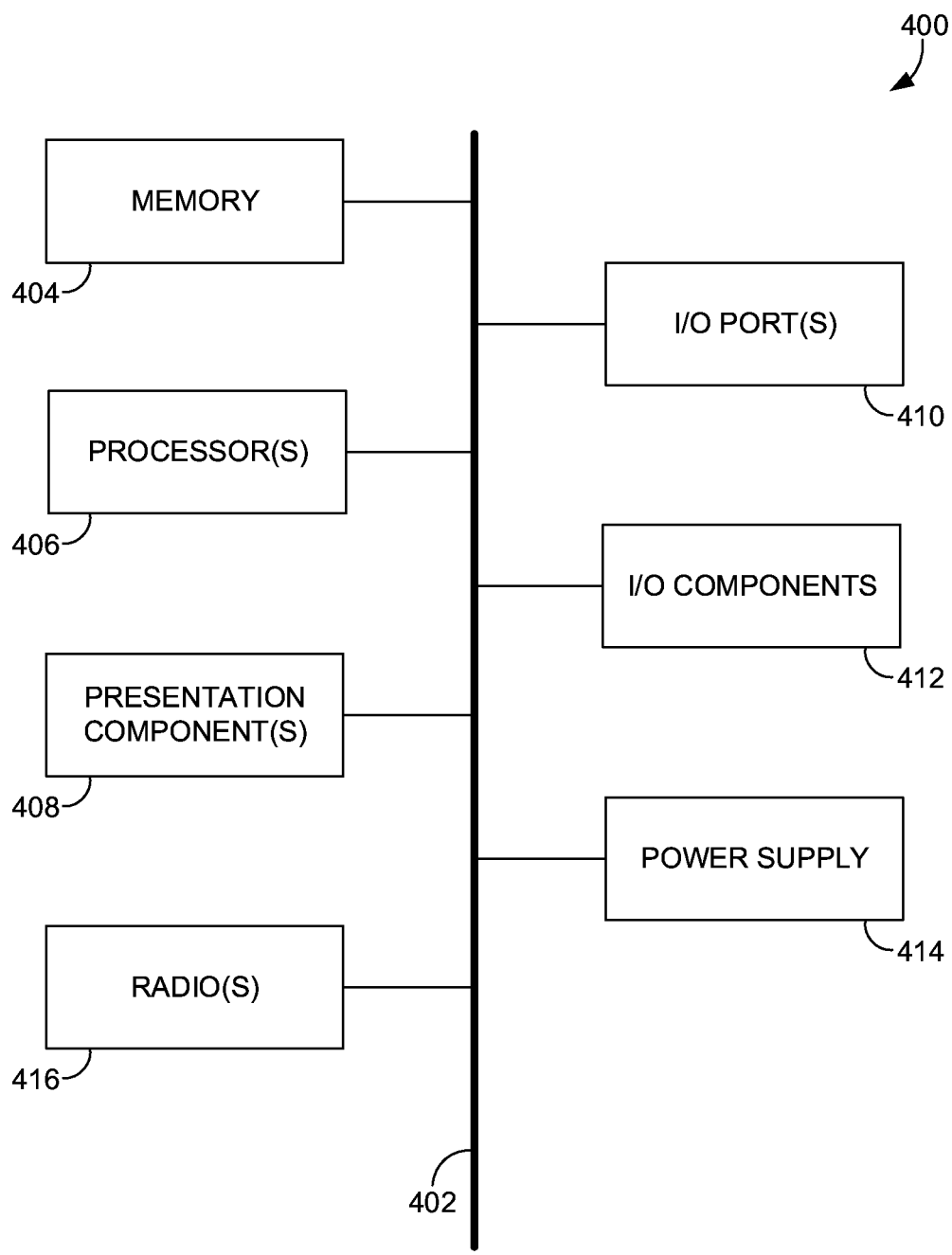
FIG. 4 depicts an example user device suitable for use in implementations of the present disclosure, in accordance with aspects herein.

As illustrated in FIG. 4, example user device 400 includes a bus 402 that directly or indirectly couples the following devices: memory 404, one or more processors 406, one or more presentation components 408, one or more input/output (I/O) ports 410, one or more I/O components 412, a power supply 414, and one or more radios 416.

Bus 402 represents what may be one or more busses (such as an address bus, data bus, or combination thereof). Although the various blocks of FIG. 4 are shown with lines for the sake of clarity, in reality, these blocks represent logical, not necessarily actual, components. For example, one may consider a presentation component, such as a display device, to be an I/O component. Also, processors have memory. Accordingly, FIG. 4 is merely illustrative of an exemplary user device that can be used in connection with one or more embodiments of the technology disclosed herein.

User device 400 can include a variety of computer-readable media. Computer-readable media can be any available media that can be accessed by user device 400 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by user device 400. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 404 includes computer storage media in the form of volatile and/or nonvolatile memory. The memory 404 may be removable, non-removable, or a combination thereof. Example hardware devices of memory 404 may include solid-state memory, hard drives, optical-disc drives, other hardware, or one or more combinations thereof. As indicated above, the computer storage media of the memory 404 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by user device 400, or one or more combinations thereof.

The one or more processors 406 of user device 400 can read data from various entities, such as the memory 404 or the I/O component(s) 412. The one or more processors 406 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 406 can execute instructions, for example, of an operating system of the user device 400 or of one or more suitable applications.

The one or more presentation components 408 can present data indications via user device 400, another user device, or a combination thereof. Example presentation components 408 may include a display device, speaker, printing component, vibrating component, another type of presentation component, or one or more combinations thereof. In some embodiments, the one or more presentation components 408 may comprise one or more applications or services on a user device, across a plurality of user devices, or in the cloud. The one or more presentation components 408 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof.

The one or more I/O ports 410 allow user device 400 to be logically coupled to other devices, including the one or more I/O components 412, some of which may be built in. Example I/O components 412 can include a microphone, joystick, game pad, satellite dish, scanner, printer, wireless device, and the like. The one or more I/O components 412 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 408 on the user device 400. In some embodiments, the user device 400 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the user device 400 may, additionally or alternatively, be equipped with accelerometers or gyroscopes that enable detection of motion. In some embodiments, the output of the accelerometers or gyroscopes may be provided to the one or more presentation components 408 of the user device 400 to render immersive augmented reality or virtual reality.

The power supply 414 of user device 400 may be implemented as one or more batteries or another power source for providing power to components of the user device 400. In embodiments, the power supply 414 can include an external power supply, such as an AC adapter or a powered docking cradle that supplements or recharges the one or more batteries. In aspects, the external power supply can override one or more batteries or another type of power source located within the user device 400.

Some embodiments of user device 400 may include one or more radios 416 (or similar wireless communication components). The one or more radios 416 can transmit, receive, or both transmit and receive signals for wireless communications. In embodiments, the user device 400 may be a wireless terminal adapted to receive communications and media over various wireless networks. User device 400 may communicate using the one or more radios 416 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 416 may facilitate communication via radio frequency signals, frames, blocks, transmission streams, packets, messages, data items, data, another type of wireless communication, or one or more combinations thereof. The one or more radios 416 may be capable of transmitting, receiving, or both transmitting and receiving wireless communications via mm waves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for a network service indicator icon, the system comprising:
   one or more processors; and
   one or more computer storage memory having computer-executable instructions stored thereon that, when executed by the one or more processors, cause the one or more processors to:
   receive a first set of data performance information for a plurality of communication service applications from a user device having each of the plurality of communication service applications downloaded onto the user device, wherein the first set of data performance information comprises one or more current measurements obtained at the user device, the one or more current measurements comprising at least one of: an actual bandwidth measurement, a latency measurement, or an amount of data transmitted over a period of time;
   determine a data performance metric for each of the plurality of communication service applications based on receiving the first set of data performance information;
   generate a network service indicator icon for each of the plurality of communication service applications based on the data performance metric determined for each of the plurality of communication service applications, each of the network service indicator icons depicting a real-time network speed of a corresponding communication service provided by that particular communication service application; and
   cause to display, on a user interface of the user device having each of the plurality of communication service applications downloaded onto the user device, the network service indicator icon, depicting the real-time network speed, for each of the plurality of communication service applications.

2. The system according to claim 1, wherein a plurality of servers provide a first communication service application of the plurality of communication service applications and a first server provides a second communication service application of the plurality of communication service applications, and wherein a second set of data performance information is received from the first server and the plurality of servers.

3. The system according to claim 1, wherein a first communication service application of the plurality of communication service applications is a three-dimensional video calling service application.

4. The system according to claim 1, wherein the one or more processors further:

determine the data performance metric determined for a first communication service application of the plurality of communication service applications is below a threshold; and update, via the user interface, the network service indicator icon for the first communication service application based on the data performance metric being below the threshold.

5. The system according to claim 1, wherein a first communication service application of the plurality of communication service applications provides voice calling communication services, and wherein a second communication service application of the plurality of communication service applications provides multimedia communication services, wherein the one or more processors further:

determine the data performance metric for the first communication service application, providing the voice calling communication services, using the first set of data performance information and the second set of data performance information for the first communication service application;

determine the data performance metric for the second communication service application, providing the multimedia communication services, using the first set of data performance information and the second set of data performance information for the second communication service application;

based on the data performance metric for the first communication service application, generate the network service indicator icon for the first communication service application providing the voice calling communication services; and based on the data performance metric for the second communication service application, generate the network service indicator icon for the second communication service application providing the multimedia communication services.

6. The system according to claim 2, wherein at least two of the plurality of communication service applications are an over-the-top messaging and voce application.

7. The system according to claim 6, wherein the second set of data performance information corresponds to an over-the-top communication session for each of the at least two of the plurality of communication service applications that are the over-the-top messaging and voice applications, and wherein a first server of the one or more servers is a mediator server.

8. The system according to claim 2, wherein the one or more processors further:

determine data performance metrics for a first communication service application of the plurality of communication service applications using the first set of data performance information and the second set of data performance information, wherein the first set of data performance information and the second set of data performance information are received for particular times during a particular time range of a particular day; and provide a plurality of network service indicator icons for the first communication service application using the data performance metrics determined.

9. A method for providing a network service indicator icon, the method comprising:

receiving a set of data performance information for a first communication service application, wherein the set of data performance information comprises one or more current measurements obtained at a user device, the one or more current measurements comprising at least one of: an actual bandwidth measurement, a latency measurement, or an amount of data transmitted over a period of time;

receiving a first set of network performance information corresponding to at least one network component in communication with a user device;

determining a data performance metric for the first communication service application based on receiving the set of data performance information and the first set of network performance information;

generating a network service indicator icon for the first communication service application based on the data performance metric determined, the network service indicator icon depicting a real-time network speed of a communication service provided by the first communication service application; and causing to display, via an interface of the user device having a communication session with the first communication service application, the network service indicator icon depicting the real-time network speed of the communication service associated with the communication session.

10. The method according to claim 9, the method further comprising:

receiving a second set of data performance information for a second communication service application from at least one server providing a second communication service via the second communication service application;

receiving a second set of network performance information corresponding to a second network component in communication with the at least one server;

determining a second data performance metric for the second communication service application based on receiving the second set of data performance information and the second set of network performance information;

generating a second network service indicator icon for the second communication service application based on the second data performance metric determined, the second network service indicator icon depicting a network speed of the second communication service provided by the second communication service application; and causing to display, via the interface of the user device having a communication session with the second communication service application, the second network service indicator icon depicting the network speed of the second communication service.

11. The method according to claim 10, wherein the first communication service application is a three-dimensional video calling service application and the second communication service application is an over-the-top messaging and voice application.

12. The method according to claim 9, wherein the first communication service application has a plurality of microservices implemented via a data center architecture including the one or more servers.

13. The method according to claim 9, wherein the first communication service application is a gaming service application that provides gaming content including video content and audio content, and wherein the one or more servers is a cloud gaming server.

14. The method according to claim 9, wherein the first communication service application is an augmented reality service application, and wherein the method further comprises:

receiving a second set of data performance information for the first communication service application from a plurality of user devices using the first communication service application;

determining the data performance metric using the second set of data performance information; and generating the network service indicator icon for the augmented reality service application based on the data performance metric determined from the first set of data performance information, the second set of data performance information, and the first set of network performance information.

15. One or more non-transitory computer storage media having computer-executable instructions embodied thereon, that when executed by at least one processor, cause the at least one processor to perform a method comprising:

receiving a first set of data performance information for a first communication service application from a first server providing the first communication service application;

identifying a user device having a communication session with the first communication service application, wherein the first set of data performance information comprises one or more current measurements obtained at the user device, the one or more current measurements comprising at least one of: an actual bandwidth measurement, a latency measurement, or an amount of data transmitted over a period of time;

determining a data performance metric for the first communication service application based on receiving the first set of data performance information and identifying the user device;

generating a network service indicator icon for the first communication service application based on the data performance metric determined for the first communication service application, the network service indicator icon depicting a real-time network speed of a communication service provided by the first communication service application; and causing to display, via an interface of the user device, the network service indicator icon depicting the real-time network speed of the communication service associated with the communication session.

16. The one or more non-transitory computer storage media of claim 15, wherein the first communication service application has a plurality of microservices implemented via an edge cloud including the first server.

17. The one or more non-transitory computer storage media of claim 15, wherein the first communication service application provides voice over internet protocol calls, video calls, and messaging communication services to the user device.

18. The one or more non-transitory computer storage media of claim 15, wherein the method further comprises:

receiving a second set of data performance information for the first communication service application from a second server providing communication services via the first communication service application; and determining the data performance metric for the first communication service application based on receiving the second set of data performance information.

19. The one or more non-transitory computer storage media of claim 15, wherein the method further comprises:

receiving a second set of data performance information for a second communication service application from a second server providing the second communication service application, wherein the user device has a communication session with the second communication service application;

receiving a third set of data performance information for a third communication service application from a third server providing the third communication service application, wherein the user device has a communication session with the third communication service application;

identifying a location of the user device;

determining a second data performance metric for the second communication service application based on receiving the second set of data performance information and identifying the location of the user device;

determining a third data performance metric for the third communication service application based on receiving the third set of data performance information and identifying the location of the user device;

generating a second network service indicator icon for the second communication service application based on the second data performance metric determined for the second communication service application, the second network service indicator icon depicting a network speed of a communication service provided by the second communication service application;

generating a third network service indicator icon for the third communication service application based on the third data performance metric determined for the third communication service application, the third network service indicator icon depicting a network speed of a communication service provided by the third communication service application; and causing to display, via the interface of the user device, the second network service indicator icon and the third network service indicator icon.

20. The one or more non-transitory computer storage media of claim 15, wherein the data performance metric is determined based on identifying a portion of a coverage area in which the user device is located.

* * * * *